May 5, 1931. W. A. GARRIGUS ET AL 1,803,550
BRAKE ROD
Filed Dec. 4, 1929  2 Sheets-Sheet 1
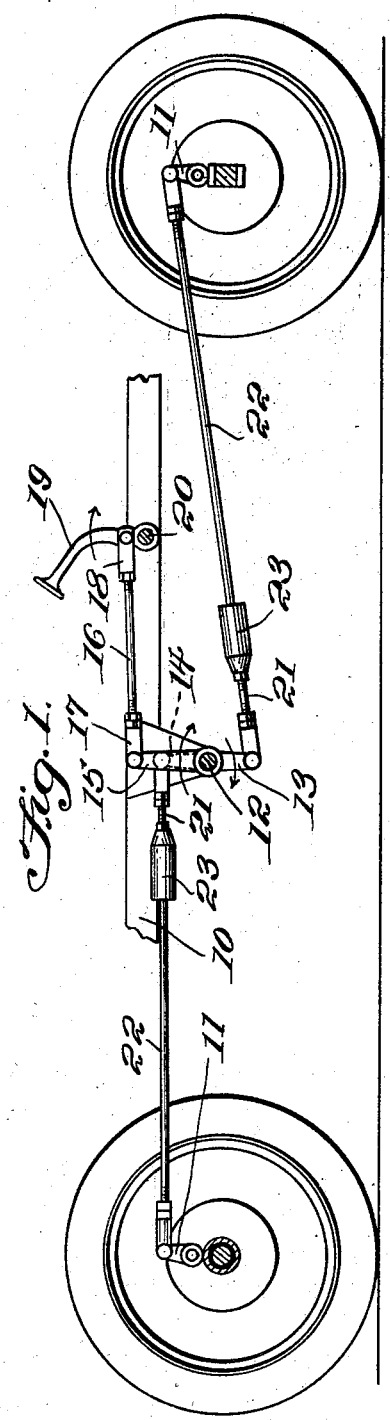
W. A. Garrigus
R. O. Garrigus INVENTOR
BY Victor J. Evans
ATTORNEY
WITNESS: J. T. L. Wright

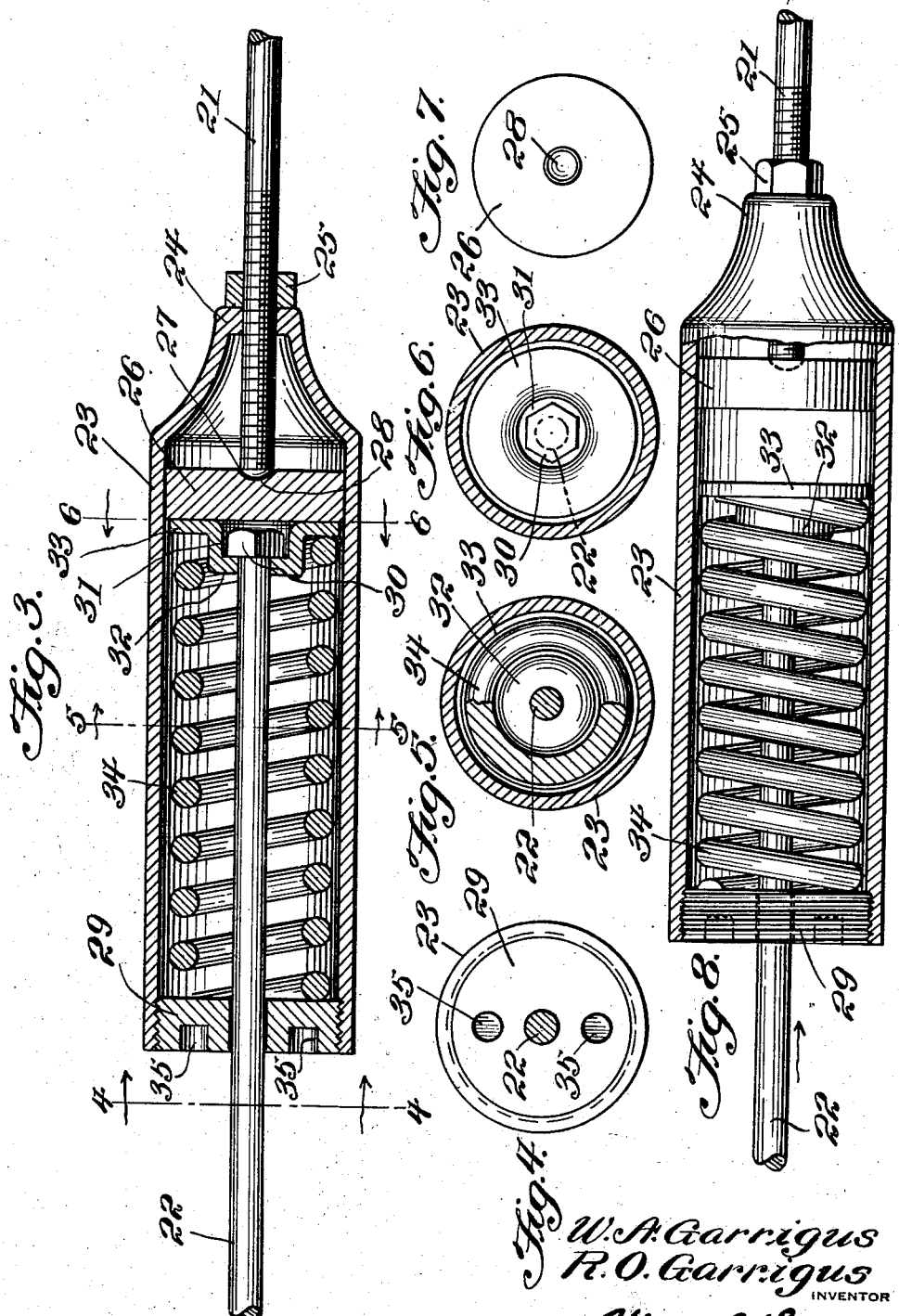

Patented May 5, 1931

1,803,550

UNITED STATES PATENT OFFICE

WALTER A. GARRIGUS AND ROBERT O. GARRIGUS, OF TOLEDO, OHIO

BRAKE ROD

Application filed December 4, 1929. Serial No. 411,570.

This invention relates to certain new and useful improvements in draft action applying mechanisms primarily designed for application and for use in conjunction with the brake rods of vehicle brake mechanisms to equalize the clamping action of the bands or shoes to obviate side sway, skidding, locked wheels, etc.

Another object of the invention consists of a yielding connection for each of the brake rods whereby movement thereof in excess to that which is necessary to engage the shoe or band with the immediate brake drum will be taken up and expanded to advantage upon the next looser brake rod to effect equalization of the draft action or brake operating mechanism.

An additional object of the invention embodies an adjusting element for the yieldable brake rod connection normally causing the connection and immediate brake rod to operate as a unitary structure in the application of the immediate brake.

More specifically stated the yieldable brake rod connections are such that rattling and other noises will be deleted in view of the constant tension exercised upon the various clevis and crank arm connections and the brakes will require but occasional adjustment by reason of the effectiveness of the equalization afforded by the connections.

With the above and other objects in view, the invention further consists of the following novel features and details of construction, to be hereinafter more fully described, illustrated in the accompanying drawings and pointed out in the appended claims.

In the drawings:—

Figure 1 is a fragmentary longitudinal sectional view taken through a motor vehicle chassis illustrating the relative arrangement of the invention as applied upon a four-wheel brake mechanism.

Figure 2 is a fragmentary top plan view of the invention as applied for use in conjunction with a four-wheel brake system.

Figure 3 is a longitudinal sectional view taken through the invention as disposed in its normal inactive or operative position.

Figures 4, 5 and 6 are horizontal sectional views taken on lines 4—4, 5—5 and 6—6 respectively through Figure 3 of the drawings.

Figure 7 is an elevation of the adjusting element.

Figure 8 is a view similar to Figure 3 showing the spring compressed for distances greater than that ordinarily required for braking the immediate wheel and during the absorption of the excess draft action and the distribution of same through the next looser or inactive brake.

Referring to the drawings in detail wherein like characters of reference denote corresponding parts, the reference character 10 indicates generally the chassis of a motor vehicle having four-wheel brakes either of the internal expanding or external contracting type, operable in either case by the distortion of crank arms 11 from the positions shown.

A rock shaft, indicated as at 12, and journaled terminally thereof within the opposed side rails of the chassis 10 is provided at intervals with pairs of fixedly connected crank arms 13 and 14 respectively for the front and rear brakes. The crank arms 13 are to be connected with the front brakes and the uppermost crank arms 14 are to be connected with the rear brakes. A crank arm 15 also fixedly connected with and upstanding from the rock shaft 12 is joined through a connecting rod 16 and clevis yoke connections 17 and 18 respectively to a brake pedal 19 rockingly mounted upon a stationary shaft 20 having rigid connection at its ends with the inner sides of the opposed side rails of the vehicle chassis.

As mentioned in the foregoing, the application of the present invention necessitates splitting or separating of the original brake rods into multiple sections which for purposes of illustration are indicated as at 21 and 22 respectively. A tubular housing member 23 having a reduced, closed and centrally apertured extremity 24 accommodates the adjacent ends of the rod sections 21. Jam nuts 25 carried upon the threaded portions of the rod sections 21 are engageable with the adjacent ends of the extremity 24. A disk member 26 of relatively thick proportions adjustably mounted within the bore of the housing 23 upon the feeding end of the rod section 21 the latter disposes the rounded extremity 27 therefor within a correspondingly shaped centrally disposed depression 28 within the disk 26 whereby the disk may be shifted rectilinearly within the housing member without canting and binding.

The complemental and remaining rod section 22 projecting centrally through a disk member 29 threadedly mounted within the opposite end of the tubular housing 23 carries a nut or bolt head 30 receivable within the pocket portion 31 of a cup-shaped member 32 having an annular flange portion 33 engageable with the adjacent surface of the disk member 26 in the manner suggested in Figure 3 of the drawings.

A compression spring, indicated as at 34, encircling that portion of the shaft section 22 disposed within the tubular housing member 23 is sprung at its ends against the adjacent sides of the disk member 29 and the flange portion 33 of the cup-shaped member 32.

As shown, the disk member 29 is provided with openings or sockets 35 eccentrically arranged upon opposite sides of the central opening therein for the accommodation of the studs or projections upon a spanner wrench, not shown, to facilitate tightening of the spring. Such tightening action, as mentioned in the foregoing, may be also accomplished by feeding the rod section 21 within the reduced extremity 24 of the tubular housing. Such tightening or tensioning action is highly desired in view of the fact that the adjusted tension is to be equivalent to that of the draft action to be set up upon the immediate brake whereby the brake rods under ordinary circumstances will work as a one-piece brake rod but upon the occasion of looseness in any one of the other brakes in the system, and upon the exercise of additional draft action upon the brake pedal the disk member 26 and flange 33 will be operated in the manner shown in Figure 8 of the drawings and such additional stress will be correspondingly delivered to the next looser brake whereby the draft action will be most effectively equalized.

The invention is susceptible of various changes in its form, proportions and minor details of construction, and the right is herein reserved to make such changes as properly fall within the scope of the appended claims.

Having described the invention, what is claimed is:—

1. An apparatus of the character described comprising a tubular housing, brake rod sections projected within the ends of the housing, means yieldingly engaging end restraining outward movement of one of said brake rod sections, and an adjusting element slidably operable by the remaining brake rod section for cooperation with the yielding means and companion brake rod section.

2. A device of the character described comprising a tubular housing member having a reduced extremity upon one end, brake rod sections extended within the ends of the housing, a stop carried upon the inner end of one of the brake rod sections, a spring element encircling the latter mentioned brake rod section and engageable with said stop, a disk carried within the larger end of the tubular housing member and engageable with the adjacent end of the spring element, an adjusting element included within the housing engageable with the other side of said stop, and the remaining of the rod sections projected through the reduced extremity having engagement with the adjusting element.

3. A device of the character described comprising a tubular housing member having a reduced extremity, a centrally apertured adjustably mounted disk arranged within the larger end of the housing, brake rod sections having their innermost ends extended axially within the housing and through the reduced extremity and centrally apertured disk respectively, a cup-shaped member carried upon the innermost end of the brake rod section projected through the centrally apertured disk, a compression spring encircling that portion of the latter mentioned brake rod section within the housing and sprung at the opposed end convolutions thereof against the centrally apertured disk and cup-shaped member, an adjusting element carried within the housing and engageable with the cup-shaped member, and means establishing operative connection between the adjusting element and the remaining of the brake rod sections.

In testimony whereof we affix our signatures.

WALTER A. GARRIGUS.
ROBERT O. GARRIGUS.